(12) United States Patent
Kichise

(10) Patent No.: US 9,157,835 B2
(45) Date of Patent: Oct. 13, 2015

(54) SENSOR DEVICE WITH PLURAL DETECTING UNITS

(71) Applicant: JTEKT CORPORATION, Osaka-shi, Osaka (JP)

(72) Inventor: Hiroshi Kichise, Kariya (JP)

(73) Assignee: JTEKT CORPORATION, Osaka (JP)

( * ) Notice: Subject to any disclaimer, the term of this patent is extended or adjusted under 35 U.S.C. 154(b) by 121 days.

(21) Appl. No.: 13/904,628

(22) Filed: May 29, 2013

(65) Prior Publication Data

US 2013/0319100 A1      Dec. 5, 2013

(30) Foreign Application Priority Data

Jun. 5, 2012 (JP) ................. 2012-128124

(51) Int. Cl.

| | |
|---|---|
| *G01M 17/06* | (2006.01) |
| *G01L 5/22* | (2006.01) |
| *G01L 25/00* | (2006.01) |
| *G01D 5/244* | (2006.01) |
| *G01L 3/10* | (2006.01) |

(52) U.S. Cl.
CPC ........... *G01M 17/06* (2013.01); *G01D 5/24461* (2013.01); *G01L 3/104* (2013.01); *G01L 5/221* (2013.01); *G01L 25/003* (2013.01)

(58) Field of Classification Search
CPC ................ G01M 17/06; G01L 5/221
USPC ....................... 73/117.01, 117.02
See application file for complete search history.

(56) References Cited

U.S. PATENT DOCUMENTS

| | | | |
|---|---|---|---|
| 7,087,889 B2* | 8/2006 | Shiba ................. | 250/231.13 |
| 2003/0217607 A1* | 11/2003 | Tokumoto et al. ........ | 73/862.191 |
| 2008/0307873 A1* | 12/2008 | Kang et al. .............. | 73/117.02 |
| 2010/0057299 A1* | 3/2010 | Burgdorf et al. ......... | 701/42 |
| 2010/0076643 A1* | 3/2010 | Kim ...................... | 701/29 |
| 2011/0087456 A1 | 4/2011 | Satou et al. | |
| 2013/0049741 A1* | 2/2013 | Kichise .................. | 324/207.16 |

FOREIGN PATENT DOCUMENTS

| | | |
|---|---|---|
| DE | 19757196 A1 | 6/1999 |
| EP | 1 503 184 A2 | 2/2005 |
| WO | 2012/050473 A1 | 4/2012 |

OTHER PUBLICATIONS

Aug. 6, 2015 Search Report issued in European Application No. 13170212.8.

\* cited by examiner

*Primary Examiner* — Eric S McCall
(74) *Attorney, Agent, or Firm* — Oliff PLC

(57) ABSTRACT

A torque sensor to which a sensor device is applied includes: a first sensor IC that detects a torque that acts on a steering shaft of a vehicle and outputs detection signals based on the detection results; and a second sensor IC that detects a torque that acts on the steering shaft of the vehicle and outputs detection signals based on the detection results.

6 Claims, 8 Drawing Sheets

WHEN ALL DETECTION SIGNALS S11
TO S14 ARE NORMAL

| TWIST ANGLE OBTAINED FROM DETECTION SIGNAL S11 | $\theta n$ |
|---|---|
| TWIST ANGLE OBTAINED FROM DETECTION SIGNAL S12 | $\theta n$ |
| TWIST ANGLE OBTAINED FROM DETECTION SIGNAL S13 | $\theta n$ |
| TWIST ANGLE OBTAINED FROM DETECTION SIGNAL S14 | $\theta n$ |

Fig. 6A

WHEN THERE IS ABNORMALITY IN
DETECTION SIGNAL S11

| TWIST ANGLE OBTAINED FROM DETECTION SIGNAL S11 | $\theta e$ |
|---|---|
| TWIST ANGLE OBTAINED FROM DETECTION SIGNAL S12 | $\theta n$ |
| TWIST ANGLE OBTAINED FROM DETECTION SIGNAL S13 | $\theta n$ |
| TWIST ANGLE OBTAINED FROM DETECTION SIGNAL S14 | $\theta n$ |

Fig. 6B

WHEN THERE IS NO SHORT CIRCUIT IN
SIGNAL LINES Ws1 TO Ws4

| DETECTION SIGNAL S11 | NORMAL DIGITAL SIGNAL PATTERN |
|---|---|
| DETECTION SIGNAL S12 | NORMAL DIGITAL SIGNAL PATTERN |
| DETECTION SIGNAL S13 | NORMAL DIGITAL SIGNAL PATTERN |
| DETECTION SIGNAL S14 | NORMAL DIGITAL SIGNAL PATTERN |

Fig. 7A

WHEN THERE IS SHORT CIRCUIT
BETWEEN SIGNAL LINES Ws1, Ws2

| DETECTION SIGNAL S11 | ABNORMAL DIGITAL SIGNAL PATTERN |
|---|---|
| DETECTION SIGNAL S12 | ABNORMAL DIGITAL SIGNAL PATTERN |
| DETECTION SIGNAL S13 | NORMAL DIGITAL SIGNAL PATTERN |
| DETECTION SIGNAL S14 | NORMAL DIGITAL SIGNAL PATTERN |

SENSOR DEVICE WITH PLURAL DETECTING UNITS

INCORPORATION BY REFERENCE/RELATED APPLICATION

This application claims priority to Japanese Patent Application No. 2012-128124 filed on Jun. 5, 2012 the disclosure of which, including the specification, drawings and abstract, is incorporated herein by reference in its entirety.

BACKGROUND OF THE INVENTION

1. Field of the Invention

The invention relates to a sensor device that detects a rotation angle, torque, or the like, of a detection object.

2. Discussion of Background

A device described in EP1503184 A2 is conventionally known as a sensor device of this type. The sensor device described in EP1503184 A2 includes a detecting unit that detects a rotation angle of a steering shaft of a vehicle. The detecting unit outputs a signal +sin θ that sinusoidally varies according to a rotation angle θ of the steering shaft and a signal +cos θ that cosinusoidally varies according to the rotation angle θ of the steering shaft. The detecting unit also outputs a signal −sin θ that is shifted in phase by 180° with respect to the signal +sin θ and a signal −cos θ that is shifted in phase by 180° with respect to the signal +cos θ. The four signals that are output from the detecting unit are input to a differential amplifying unit. The differential amplifying unit generates a first differential amplification signal (2 sin θ) by amplifying the difference between the signal +sin θ and the signal −sin θ, and outputs the first differential amplification signal to a computing unit. In addition, the differential amplifying unit generates a second differential amplification signal (2 cos θ) by amplifying the difference between the signal +cos θ and the signal −cos θ, and outputs the second differential amplification signal to the computing unit. The computing unit obtains the rotation angle θ of the steering shaft by computing an arctangent of these first differential amplification signal and second differential amplification signal.

On the other hand, in the sensor device described in EP1503184 A2, a first addition signal is generated by adding the signal +sin θ to the signal −sin θ, and a second addition signal is generated by adding the signal +cos θ to the signal −cos θ. When any one of the first addition signal and the second addition signal exceeds an upper limit threshold or becomes lower than a lower limit threshold, it is determined that there is an abnormality in the detecting unit. According to this abnormality detection method, it is possible to detect an abnormality in the detecting unit.

In the sensor device described in EP1503184 A2, for example, when the first addition signal exceeds the upper limit threshold, the first differential amplification signal has an abnormal value, and therefore, it is not possible to compute the rotation angle θ of the steering shaft. In addition, when the first addition signal exceeds the upper limit threshold, it is understood that any one of the signal +sin θ and the signal −sin θ is abnormal, however it is not possible to determine which one of the signal +sin θ and the signal −sin θ is abnormal. If a factor that makes the first addition signal exceed the upper limit threshold is an abnormality of the signal +sin θ and then it is possible to identify this factor, it is possible to continue computation of the rotation angle θ of the steering shaft using the normal signal −sin θ and the signal +cos θ or the signal −cos θ. Thus, redundancy significantly improves.

Therefore, a sensor device that is able to identify a detection signal having an abnormality is desired.

The above-described problem is not limited to the sensor device that detects the rotation angle of the steering shaft, and it is a problem common to various sensor devices that detect a state quantity of any detection object, such as a sensor device that detects a torque that acts on the steering shaft.

SUMMARY OF THE INVENTION

The invention provides a sensor device that is able to determine which detection signal has an abnormality among a plurality of detection signals and that is easily manufactured.

According to a feature of an example of the invention, a sensor device includes a plurality of sensor ICs each of which has a plurality of detecting units that detect a same state quantity for a same detection object and that respectively output detection signals based on detection results.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 6A is a table that shows an example of computed results of twist angles that are obtained from detection signals S11 to S14 that are output from two sensor ICs when all the detection signals S11 to S14 are normal;

FIG. 6B is a table that shows an example of computed results of twist angles that are obtained from the detection signals S11 to S14 when there is an abnormality in the detection signal S11;

FIG. 7A is a table that shows an example of signal patterns of the detection signals S11 to S14 when there is no short circuit in signal lines Ws1 to Ws4;

FIG. 7B is a table that shows an example of signal patterns of the detection signals S11 to S14 when there is a short circuit between the signal lines Ws1, Ws2;

DETAILED DESCRIPTION OF EMBODIMENTS

Hereinafter, embodiments of the invention will be described with reference to the accompanying drawings.

Figure 1:
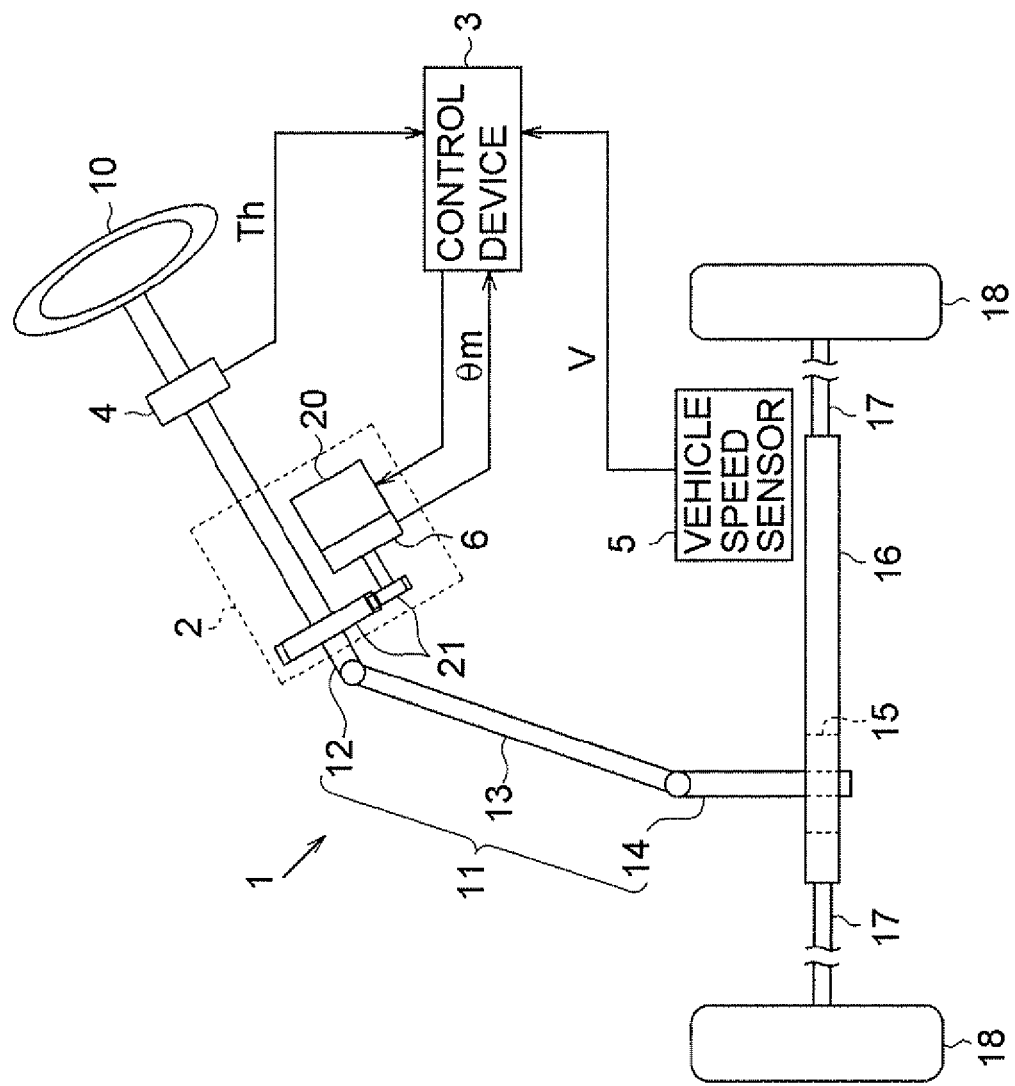
FIG. 1 is a block diagram that shows the configuration of a vehicle power steering system.

An embodiment in which the invention is applied to a torque sensor for a vehicle power steering system will be described with reference to FIG. 1 to FIG. 8. First, the outline of the vehicle power steering system will be described with reference to FIG. 1. As shown in FIG. 1, the power steering system includes a steering mechanism 1 and an assist mechanism 2. Steered wheels 18 are steered by the steering mechanism 1 on the basis of driver's operation of a steering wheel 10. The assist mechanism 2 assists driver's steering operation.

The steering mechanism 1 includes a steering shaft 11 that serves as a rotary shaft of the steering wheel 10. The steering shaft 11 is formed of a column shaft 12, an intermediate shaft 13 and a pinion shaft 14. The column shaft 12 is coupled to the center of the steering wheel 10. The intermediate shaft 13 is coupled to the lower end portion of the column shaft 12. The pinion shaft 14 is coupled to the lower end portion of the intermediate shaft 13. A rack shaft 16 is coupled to the lower end portion of the pinion shaft 14 via a rack-and-pinion mechanism 15. Thus, when the steering shaft 11 rotates due to driver's steering operation, the rotating motion is converted to the reciprocal linear motion of the rack shaft 16 in the axial direction via the rack-and-pinion mechanism 15. The reciprocal linear motion of the rack shaft 16 is transmitted to the steered wheels 18 via tie rods 17 coupled to both ends of the rack shaft 16. Thus, the steered angle of the steered wheels 18 changes, and the travel direction of the vehicle is changed.

The assist mechanism 2 includes an electric motor 20 that applies assist torque to the column shaft 12. The rotation of the electric motor 20 is transmitted to the column shaft 12 via a gear mechanism 21. Thus, motor torque is applied to the steering shaft 11, and steering operation is assisted.

The power steering system includes various sensors that detect an operation amount of the steering wheel 10 and a state quantity of the vehicle. For example, a torque sensor 4 is provided on the column shaft 12. The torque sensor 4 detects a torque (steering torque) Th that is applied to the steering shaft 11 due to driver's steering operation. The vehicle includes a vehicle speed sensor 5 that detects a travel speed V of the vehicle. A rotation angle sensor 6 is provided at the electric motor 20. The rotation angle sensor 6 detects a rotation angle θm of the electric motor 20. Outputs of these sensors are input to a control device 3. The control device 3 sets a target assist torque on the basis of the outputs of the sensors, and executes feedback control over a current that is supplied to the electric motor 20 such that the assist torque that is applied from the electric motor 20 to the column shaft 12 becomes the target assist torque.

Figure 2:
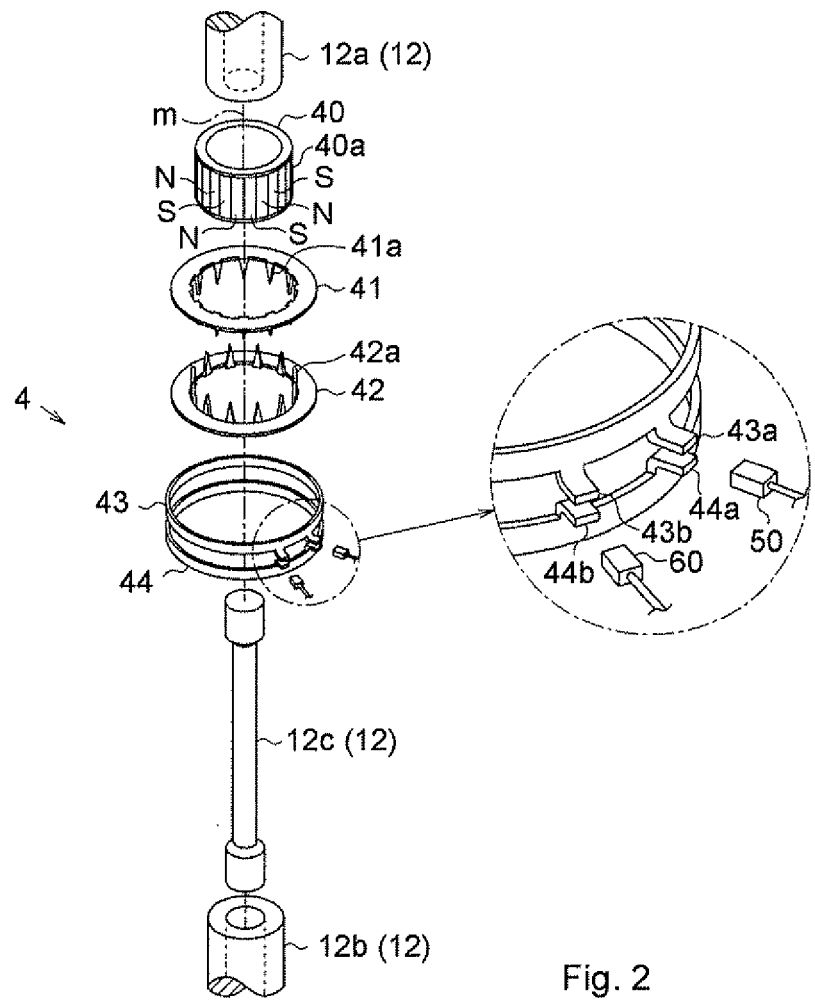
FIG. 2 is a perspective view that shows an exploded perspective structure of a torque sensor according to one embodiment, to which a sensor device according to the invention is applied.
Figure 3:
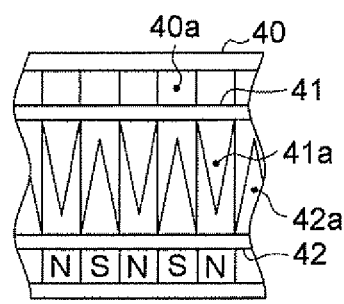
FIG. 3 is a developed view in which two yokes and a holding member in the torque sensor according to the embodiment are developed in a plane.

The structure of the torque sensor 4 will be described with reference to FIG. 2 and FIG. 3. As shown in FIG. 2, the column shaft 12 has such a structure that a steering wheel 10-side input shaft 12a and an intermediate shaft 13-side lower shaft 12b are coupled to each other along the same axis m via a torsion bar 12c. When the steering torque Th is applied to the input shaft 12a due to operation of the steering wheel 10, a twisting deformation occurs in the torsion bar 12c at the time when the steering torque Th is transmitted from the input shaft 12a to the lower shaft 12b via the torsion bar 12c. Thus, a relative rotational displacement based on the steering torque Th occurs between the input shaft 12a and the lower shaft 12b.

The torque sensor 4 includes a cylindrical holding member 40 and annular two yokes 41, 42. The holding member 40 is fitted to the outer periphery of the lower end portion of the input shaft 12a. The yokes 41, 42 are fixed to the lower shaft 12b so as to surround the holding member 40 with a predetermined clearance from the holding member 40.

A multipolar magnet 40a is provided at the outer periphery of the holding member 40. In the multipolar magnet 40a, magnetic N-poles and magnetic S-poles are arranged alternately in the circumferential direction. Pawl portions 41a that extend downward and parallel to the axis m are formed at the inner periphery of the first yoke 41. Pawl portions 42a that extend upward and parallel to the axis m are formed at the inner periphery of the second yoke 42. FIG. 3 is a developed view in which the yokes 41, 42 and the holding member 40 are developed in a plane. As shown in FIG. 3, the respective pawl portions 41a, 42a of the yokes 41, 42 are arranged alternately in the circumferential direction. In addition, the pawl portions 41a, 42a are arranged so as to face the multipolar magnet 40a.

As shown in FIG. 2, the torque sensor 4 includes an annular first magnetic flux collecting ring 43 and an annular second magnetic flux collecting ring 44. The first magnetic flux collecting ring 43 is arranged so as to surround the first yoke 41 with a predetermined clearance from the first yoke 41. The second magnetic flux collecting ring 44 is arranged so as to surround the second yoke 42 with a predetermined clearance from the second yoke 42. These magnetic flux collecting rings 43, 44 are made of a magnetic material.

The first magnetic flux collecting ring 43 and the second magnetic flux collecting ring 44 respectively include magnetic flux collecting portions 43a, 44a and magnetic flux collecting portions 43b, 44b. The magnetic flux collecting portions 43a, 44a are arranged to face each other with a predetermined clearance therebetween, and the magnetic flux collecting portions 43b, 44b are arranged to face each other at a predetermined clearance therebetween. A sensor IC 50 is arranged between the magnetic flux collecting portions 43a, 44a, and a sensor IC 60 is arranged between the magnetic flux collecting portions 43b, 44b. Each of the sensor ICs 50, 60 outputs a signal based on the strength of magnetism (magnetic field) applied.

In the torque sensor 4, when the steering torque Th is input to the input shaft 12a and then a relative rotational displacement occurs between the input shaft 12a and the lower shaft 12b, a positional relationship between the holding member 40 and the two yokes 41, 42 changes, and magnetism that is collected in each of the yokes 41, 42 varies. Thus, the strength of magnetism that is applied to the sensor ICs 50, 60 varies, and a signal based on a relative rotational displacement between the input shaft 12a and the lower shaft 12b is output from each of the sensor ICs 50, 60. In other words, a signal based on the twist angle of the torsion bar 12c is output from each of the sensor ICs 50, 60.

Figure 4:
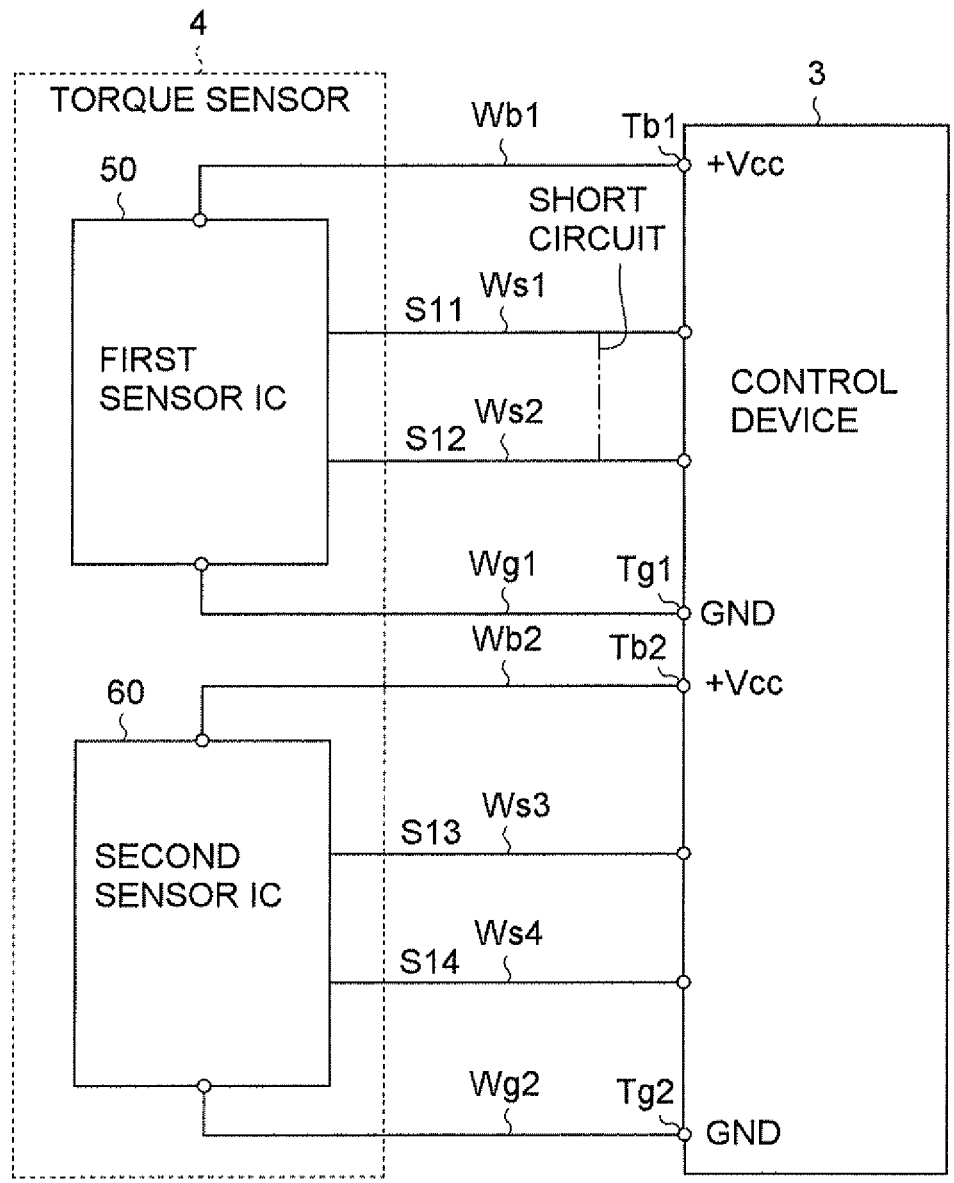
FIG. 4 is a block diagram that shows the electrical configuration of the torque sensor according to the embodiment.

Next, the structure of the sensor ICs 50, 60 will be described with reference to FIG. 4 to FIG. 6B. As shown in FIG. 4, the first sensor IC 50 is connected to a feeder terminal Tb1 of the control device 3 via a feeder Wb1. The first sensor IC 50 is connected to a grounding terminal Tg1 of the control device 3 via a ground line Wg1. The first sensor IC 50 uses a voltage "+Vcc", which is applied from the feeder terminal Tb1 of the control device 3 via the feeder Wb1, as an operating power supply. The first sensor IC 50 outputs two detection signals S11, S12 based on the twist angle of the torsion bar 12c to the control device 3 via corresponding signal lines Ws1, Ws2.

Figure 5:
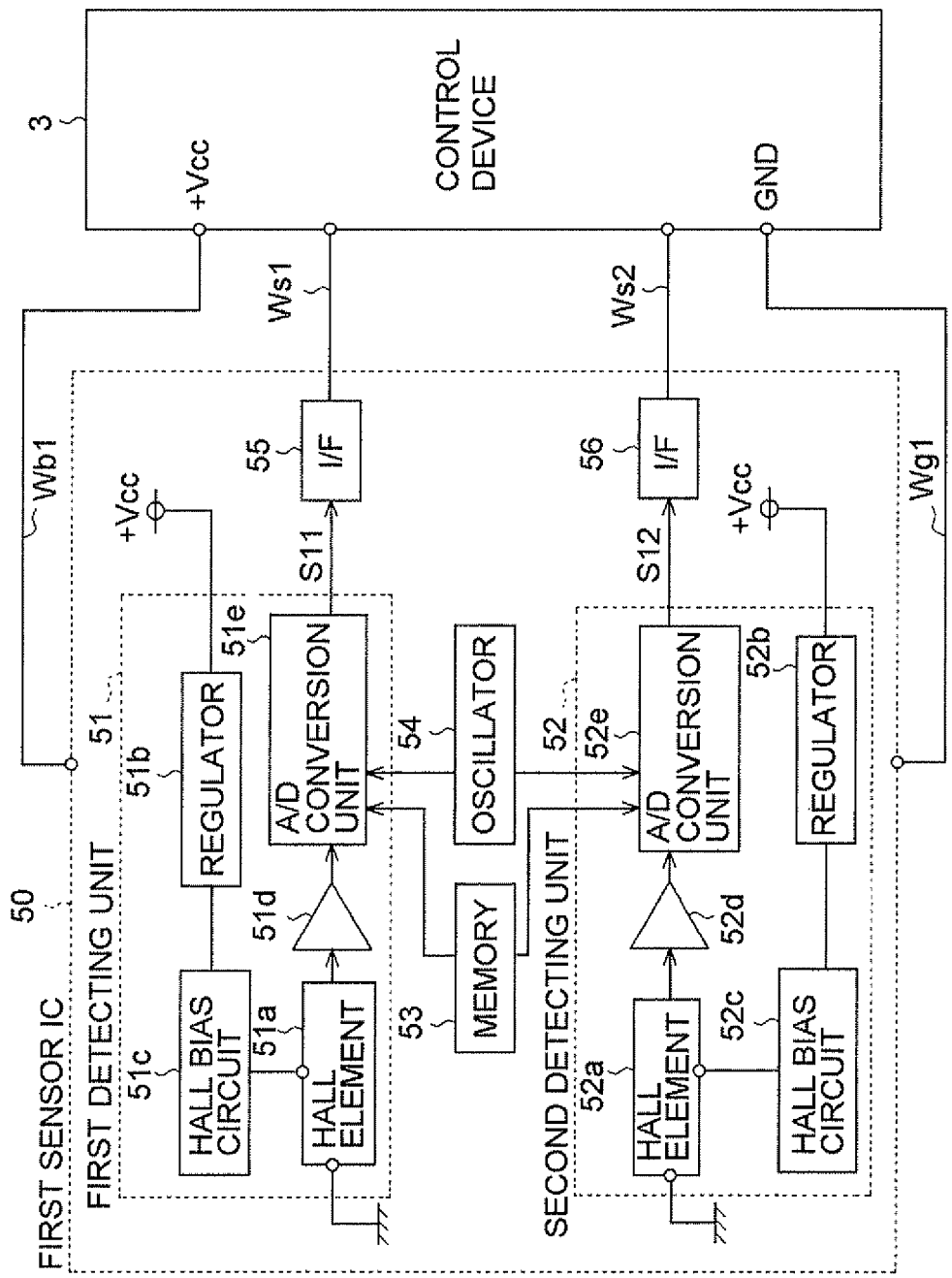
FIG. 5 is a block diagram that shows the electrical configuration of a first sensor IC in the torque sensor according to the embodiment.

As shown in FIG. 5, the first sensor IC 50 includes a first detecting unit 51 that outputs the detection signal S11 and a second detecting unit 52 that outputs the detection signal S12. The first detecting unit 51 includes a Hall element 51a that outputs a Hall voltage based on the strength of magnetism applied. The first detecting unit 51 includes a regulator 51b and a Hall bias circuit 51c. The regulator 51b regulates the power supply voltage "+Vcc" of the first sensor IC 50 to a predetermined voltage corresponding to the detecting unit 51.

The Hall bias circuit 51c applies a bias voltage to the Hall element 51a on the basis of the voltage that is generated by the regulator 51b.

In the first detecting unit 51, after a voltage signal that is output from the Hall element 51a has been amplified by an amplifier 51d, the amplified voltage signal is converted from an analog signal to a digital signal at an analog-to-digital conversion unit (A/D conversion unit) 51e. When the A/D conversion unit 51e generates a digital signal, the A/D conversion unit 51e executes signal processing for correcting an analog signal from the amplifier 51d to a desired signal. More specifically, the A/D conversion unit 51e reads information required for signal processing from a nonvolatile memory 53 provided in the first sensor IC 50. The memory 53 is, for example, an EEPROM, or the like. The memory 53 prestores various pieces of information required for correction, such as an offset correction value and a temperature correction value. The A/D conversion unit 51e generates the detection signal S11 by correcting the analog signal from the amplifier 51d on the basis of the information read from the memory 53, and then converts the detection signal S11 from an analog signal to a digital signal. The A/D conversion unit 51e generates a digital signal on the basis of a clock signal from an oscillator 54 provided in the first sensor IC 50. The detection signal S11 that is generated at the A/D conversion unit 51e is a signal of which the value linearly varies with respect to the twist angle of the torsion bar 12c. The detection signal S11 is input from an interface 55 to the control device 3 via the signal line Ws1.

The second detecting unit 52 basically has a structure similar to that of the first detecting unit 51. That is, the second detecting unit 52 also includes a Hall element 52a, a regulator 52b, a Hall bias circuit 52c, an amplifier 52d and an A/D conversion unit 52e. The A/D conversion unit 52e generates the detection signal S12 by correcting the analog signal from the amplifier 52d on the basis of the information stored in the memory 53, and then converts the detection signal S12 from an analog signal to a digital signal. The A/D conversion unit 52e also generates a digital signal on the basis of the clock signal from the oscillator 54 provided in the first sensor IC 50. The detection signal S12, as well as the detection signal S11, is also a signal of which the value linearly varies with respect to the twist angle of the torsion bar 12c. The detection signal S12 is input from an interface 56 to the control device 3 via the signal line Ws2.

On the other hand, as shown in FIG. 4, the second sensor IC 60 is connected to a feeder terminal Tb2 of the control device 3 via a feeder Wb2. The second sensor IC 60 is connected to a grounding terminal Tg2 of the control device 3 via a ground line Wg2. The second sensor IC 60 uses a voltage "+Vcc", which is applied from the feeder terminal Tb2 of the control device 3 via the feeder Wb2, as an operating power supply.

The second sensor IC 60 has a structure similar to that of the first sensor IC 50. That is, the second sensor IC 60 outputs a detection signal S13 similar to the detection signal S11 of the first sensor IC 50. The second sensor IC 60 outputs a detection signal S14 similar to the detection signal S12 of the first sensor IC 50. The two detection signals S13, S14 that are output from the second sensor IC 60 are input to the control device 3 via signal lines Ws3, Ws4.

The control device 3 obtains the twist angle of the torsion bar 12c on the basis of the detection signals S11 to S14 that are output from the sensor ICs 50, 60. More specifically, when the control device 3 acquires the detection signals S11 to S14 from the sensor ICs 50, 60, the control device 3 computes the twist angles of the torsion bar 12c, which respectively correspond to the detection signals S11 to S14, using a predetermined map. The control device 3 computes the steering torque Th by multiplying the spring constant of the torsion bar 12c by the computed twist angle.

On the other hand, the control device 3 according to the present embodiment detects an abnormality in the detection signals S11 to S14 by comparing the twist angles respectively obtained from the detection signals S11 to S14 with one another. The control device 3 detects a short circuit between any two of the signal lines Ws1 to Ws4 and an abnormality in each of the oscillators 54 of the respective sensor ICs 50, 60 by monitoring the signal patterns of all the detection signals S11 to S14. Hereinafter, principles of short circuit detection and abnormality detection will be described.

As shown in FIG. 6A, when all the detection signals S11 to S14 are normal, all the twist angles that are respectively obtained from the detection signals S11 to S14 are the same value $\theta$n. In contrast to this, for example, there may be the case where an abnormality occurs in the Hall element 51a or the regulator 51b in the first detecting unit 51 of the first sensor IC 50, and the detection signal S11 that is output from the first sensor IC 50 is abnormal. In this case, as shown in FIG. 6B, the twist angles that are respectively obtained from the detection signals S12 to S14 are the same value $\theta$n. However, the twist angle that is obtained from the detection signal S11 becomes a value $\theta$e different from $\theta$n. Thus, when the detection results respectively obtained from the detection signals S11 to S14 are compared with one another and then a majority is determined, it is possible to determine that the twist angle obtained from the detection signal S11 is an abnormal value. Thus, it is possible to determine that the detection signal S11 is abnormal.

On the other hand, as shown in FIG. 7A, when there is no short circuit in all the signal lines Ws1 to Ws4, the detection signals S11 to S14 respectively show normal digital signal patterns. In contrast to this, as indicated by the two-dot chain line in FIG. 4, for example, there may be the case where a short circuit occurs between the signal lines Ws1, Ws2 of the first sensor IC 50. In this case, the detection signals S11, S12 that are output from the first sensor IC 50 to the signal lines Ws1, Ws2 interfere with each other. In the case where these detection signals S11, S12 are digital signals, if those detection signals S11, S12 interfere with each other, the signal patterns of the detection signals S11, S12 become abnormal. Thus, as shown in FIG. 7B, the signal patterns of the detection signals S11, S12 that are input to the control device 3 become abnormal, and the signal patterns of the other detection signals S13, S14 are normal. Thus, in the control device 3, when the signal patterns of all the detection signals S11 to S14 are monitored, it is possible to detect a short circuit between any two of the signal lines Ws1 to Ws4.

In addition, for example, there may be the case where an abnormality occurs in the oscillator 54 of the first sensor IC 50 shown in FIG. 5. In this case, the signal pattern of the detection signal S11 that is generated at the A/D conversion unit 51e of the first detecting unit 51 and the signal pattern of the detection signal S12 that is generated at the A/D conversion unit 52e of the second detecting unit 52 become abnormal. That is, as illustrated in FIG. 7B, the signal patterns of the detection signals S11, S12 that are input to the control device 3 become abnormal, and the signal patterns of the other detection signals S13, S14 are normal. Thus, as in the case of detecting a short circuit between any two of the signal lines Ws1 to Ws4, it is possible to detect an abnormality in the oscillator 54 by monitoring the signal patters of all the detection signals S11 to S14.

Figure 8:
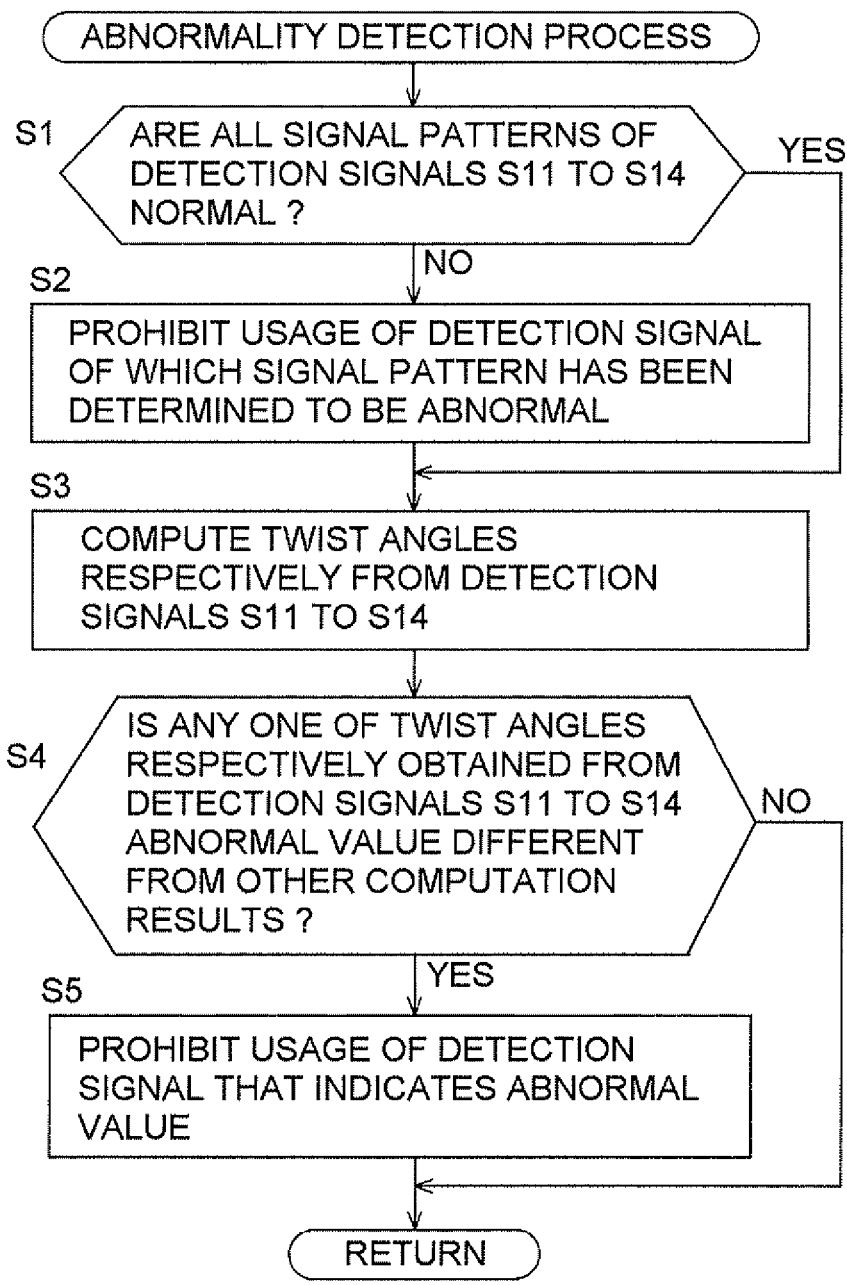
FIG. 8 is a flowchart that shows the procedure of an abnormality detection process that is executed in the torque sensor according to the embodiment.

Next, an abnormality detection process that is executed by the control device 3 by utilizing the above-described principles, and its operation will be described with reference to FIG. 8. As shown in FIG. 8, first, the control device 3 determines whether all the signal patterns of the detection signals S11 to S14 are normal (step S1). Here, when a short circuit occurs between any two of the signal lines Ws1 to Ws4 or when an abnormality occurs in any one of the oscillators 54 respectively provided in the sensor ICs 50, 60, the signal patterns of at least two detection signals among the detection signals S11 to S14 become abnormal. When there is the detection signal having an abnormal signal pattern among the detection signals S11 to S14 (NO in step S1), the control device 3 prohibits usage of the detection signal of which the signal pattern is determined to be abnormal (step S2).

In addition, when the process of step S2 has been executed or when all the signal patterns of the detection signals S11 to S14 are normal (YES in step S1), the control device 3 respectively computes the twist angles from all the detection signals S11 to S14 (step S3). Here, when there is an abnormality in any one of the detecting units 51, 52 provided in the sensor ICs 50, 60, any one of the detection signals S11 to S14 becomes abnormal. Thus, any one of the twist angles that are respectively obtained from the detection signals S11 to S14 indicates a value different from the other computation results. When any one of the twist angles that are respectively obtained from the detection signals S11 to S14 indicates an abnormal value different from the other computation results (YES in step S4), the control device 3 prohibits usage of the detection signal that indicates the abnormal value (step S5). Then, when the process of step S5 has been executed or all the twist angles that are respectively obtained from the detection signals S11 to S14 are the same value (NO in step S4), the control device 3 executes the process shown in FIG. 8 again after a lapse of a predetermined interval.

When the control device 3 has prohibited usage of at least one of the detection signals in the process of step S2 or in the process of step S5, the control device 3 executes the process shown in FIG. 8 over the remaining detection signals other than the at least one of the detection signals, which has been prohibited from being used. Thus, the process shown in FIG. 8 continues to be performed over the remaining detection signals other than all the detection signals that have been prohibited from being used in the past.

With the above configuration, for example, even when an abnormality occurs in the first detecting unit 51 of the first sensor IC 50 and the detection signal S11 becomes abnormal, the control device 3 is able to compute the steering torque Th by using the twist angles that are respectively obtained from the other detection signals S12 to S14. Moreover, after that, for example, even when the detection signal S14 that is output from the second sensor IC 60 becomes abnormal, the control device 3 is able to compute the steering torque Th by using the twist angles that are respectively obtained from the remaining detection signals S12, S13.

Even when the signal patterns of the detection signals S11, S12 of the first sensor IC 50 become abnormal due to a short circuit between the signal lines Ws1, Ws2 or occurrence of an abnormality in the oscillator 54 of the first sensor IC 50, the control device 3 is able to compute the steering torque Th by using the twist angles that are respectively obtained from the detection signals S13, S14 of the second sensor IC 60.

Moreover, as shown in FIG. 4, the two sensor ICs 50, 60 individually include the respective feeders Wb1, Wb2, and the respective ground lines Wg1, Wg2. Therefore, if any one of them breaks, one of the sensor ICs 50, 60 normally operates. Therefore, the control device 3 is able to compute the steering torque Th by using the detection signals that are output from the normal sensor IC.

In this way, with the torque sensor 4 according to the present embodiment, it is possible to continue the computation of the steering torque Th even when the above-described various abnormalities occur, and therefore, redundancy improves.

As described above, with the torque sensor 4 according to the present embodiment, the following advantageous effects are obtained. (1) The torque sensor 4 includes the first sensor IC 50 that detects the twist angle of the torsion bar 12c and outputs the detection signals S11, S12 based on the detection results and the second sensor IC 60 that detects the twist angle of the torsion bar 12c and outputs the detection signals S13, S14 based on the detection results. Thus, by comparing the twist angles that are respectively obtained from the detection signals S11 to S14 with one another, it is possible to determine which detection signal is abnormal among the detection signals S11 to S14. Thus, when the twist angles are detected by using the remaining detection signals other than the abnormal detection signal, it is possible to continue detection of the steering torque Th, and therefore, redundancy improves. In addition, it is just required to provide the second sensor IC 60 having a structure similar to the structure of the first sensor IC 50 that outputs the detection signals S11, S12, and therefore, it is easy to manufacture the torque sensor 4.

(2) In the control device 3, the twist angles are respectively detected on the basis of the detection signals S11 to S14 from the sensor ICs 50, 60, and it is determined which detection signal is abnormal among the detection signals S11 to S14 on the basis of a comparison among the detected twist angles. Thus, it is possible to easily determine which detection signal is abnormal among the detection signals S11 to S14.

(3) In the control device 3, when at least one detection signal has been determined to be abnormal, the twist angles are respectively detected from the remaining detection signals other than the at least one detection signal determined to be abnormal, and it is further determined which detection signal is abnormal among the remaining detection signals on the basis of a comparison among the detected twist angles. Thus, it is possible to continue detection of the steering torque Th by detecting the twist angles on the basis of the remaining detection signals other than all the detection signals determined to be abnormal in the past. Therefore, redundancy further improves.

(4) In the sensor ICs 50, 60, the detection signals S11 to S14 are output to the control device 3 as digital signals. With this configuration, in the control device 3, by monitoring the respective signal patterns of the detection signals S11 to S14, it is possible to easily detect a short circuit between any two of the signal lines Ws1 to Ws4. Thus, it is possible to continue detection of the steering torque Th by detecting the twist angles on the basis of the detection signals that are respectively output from the remaining signal lines other than the signal lines from which a short circuit has been detected. Therefore, redundancy further improves.

(5) In each of the sensor ICs 50, 60, the regulators 51b, 52b are respectively provided in the detecting units 51, 52. With this configuration, when an abnormality occurs in the regulators 51b, 52b, it is possible to easily determine which one of the regulators of the detecting units 51, 52 of the sensor ICs 50, 60 has an abnormality by comparing the twist angles that are respectively obtained from the detection signals S11 to S14. Thus, it is possible to continue detection of the steering torque Th by detecting the twist angles using the remaining detection signals other than the detection signal from the detecting unit in which the regulator has an abnormality. Therefore, redundancy improves.

(6) In each of the sensor ICs 50, 60, the oscillator 54 common to the detecting units 51, 52 is provided. With this configuration, in the control device 3, it is possible to easily identify the sensor IC in which the oscillator 54 has an abnormality, by monitoring the respective signal patterns of the detection signals S11 to S14. Thus, it is possible to continue detection of the steering torque Th by detecting the twist angles on the basis of the detection signals from the sensor IC other than the sensor IC in which the oscillator 54 has an abnormality. Therefore, redundancy further improves. In comparison with the case where oscillators are respectively and individually provided in the two detecting units 51, 52, it is possible to reduce the number of components of each of the sensor ICs 50, 60.

(7) The sensor ICs 50, 60 individually include the respective feeders Wb1, Wb2. With this configuration, even when a break occurs in one of the feeders Wb1, Wb2 of the sensor ICs 50, 60, it is possible to continue detection of the steering torque Th by using the detection signals that are output from the sensor IC in which the feeder has no break. Therefore, redundancy improves.

(8) The sensor ICs 50, 60 individually include the respective ground lines Wg1, Wg2. With this configuration, even when a break occurs in one of the ground lines Wg1, Wg2 of the sensor ICs 50, 60, it is possible to continue detection of the steering torque Th by using the detection signals that are output from the sensor IC in which the ground line has no break. Therefore, redundancy improves.

The above-described embodiment may be appropriately modified and implemented in the following modes.

Figure 9:
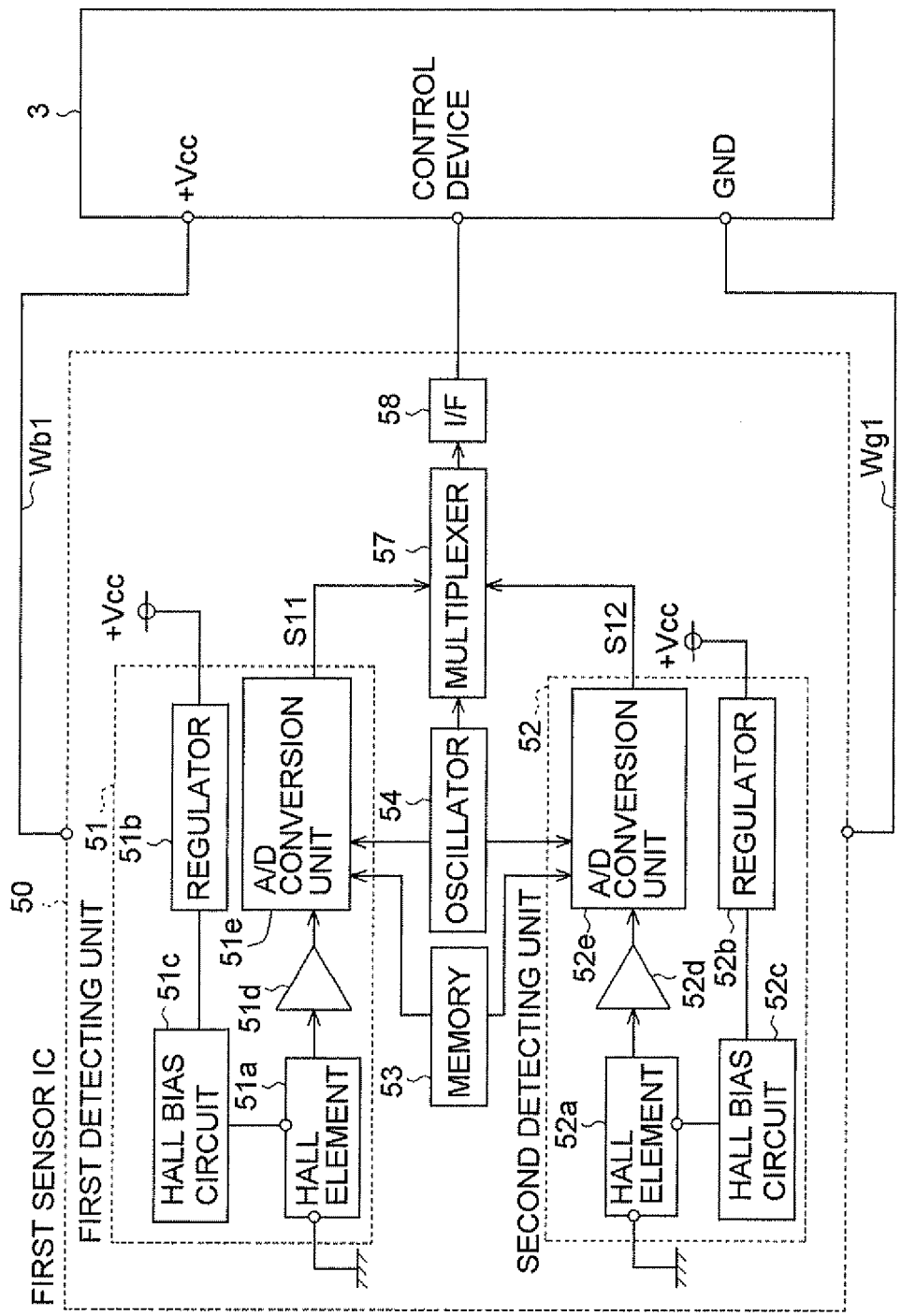
FIG. 9 is a block diagram that shows the electrical configuration of a first sensor IC in a torque sensor according to another embodiment, to which the invention is applied.

In the above-described embodiment, the detection signals S11, S12 are separately input to the control device 3 via the signal lines Ws1, Ws2. Alternatively, the detection signals S11, S12 of the first sensor IC 50 may be input to the control device 3 via a single signal line. More specifically, as shown in FIG. 9, a multiplexer 57 is provided in the first sensor IC 50, and the respective detection signals S11, S12 of the two detecting units 51, 52 are input to the multiplexer 57. The multiplexer 57 selectively outputs the detection signals S11, S12 from the detecting units 51, 52 to the control device 3 via an interface 58. A similar configuration may be employed for the second sensor IC 60. With such a configuration as well, it is possible to obtain advantageous effects similar to those of the above-described embodiment.

In the above-described embodiment, an abnormality is detected by utilizing the respective signal patterns of the detection signals S11 to S14, and an abnormality is detected by utilizing the twist angles that are respectively obtained from the detection signals S11 to S14. Alternatively, only one of those detections may be performed. More specifically, in the case of performing only the former abnormality detection, the control device 3 needs to execute only the processes of step S1 and step S2 in the abnormality detection process illustrated in FIG. 8. In the case of performing only the latter abnormality detection, the control device 3 needs to execute only the processes of step S3 to step S5 in the abnormality detection process illustrated in FIG. 8.

In the above-described embodiment, the two sensor ICs 50, 60 individually include the respective feeders Wb1, Wb2 and the respective ground lines Ws1, Wg2. Alternatively, the sensor ICs 50, 60 may share a single feeder or may share a single ground line.

In the above-described embodiment, the oscillator 54 common to the detecting units 51, 52 is provided in each of the sensor ICs 50, 60. Alternatively, an oscillator may be individually provided for each of the detecting units 51, 52.

In the above-described embodiment, the two detecting units 51, 52 individually include the respective regulators 51b, 52b in each of the sensor ICs 50, 60. Alternatively, a regulator common to the detecting units 51, 52 may be provided.

In the above-described embodiment, the detection signals S11 to S14 that are output from the sensor ICs 50, 60 are digital signals. Alternatively, these may be analog signals.

In the above-described embodiment, the sensor device according to the invention is applied to the torque sensor 4. Alternatively, the sensor device according to the invention may be applied to an appropriate sensor device, for example, a device that detects the rotation angle of the steering shaft 11 as in the case of the sensor device described in EP1503184 A2. In addition, the invention is not limited to the sensor device provided in the vehicle. The invention is applicable to any sensor device for an apparatus other than the vehicle. In this case, the structure of the detecting units 51, 52 of each of the sensor ICs 50, 60 may be changed as needed in accordance with a detection object. For example, the Hall elements 51a, 52a respectively provided in the detecting units 51, 52 may be changed to magnetoresistance elements, or the like. In short, it is just required to include two sensor ICs each of which detects the same state quantity for the same detection object and outputs two detection signals based on the detection results.

In the above-described embodiment, each of the sensor ICs 50, 60 includes the detecting units 51, 52. Alternatively, each of the sensor ICs 50, 60 may include three or more detecting units. In addition, the sensor device may include three or more sensor ICs.

What is claimed is:

1. A sensor device comprising:
a plurality of sensor integrated circuits (ICs) each of which has a plurality of detecting units that detect a same state quantity for a same detection object and that respectively output detection signals based on detection results;
wherein the state quantity of the detection object is detected on the basis of each of a plurality of the detection signals that are respectively output from the plurality of detecting units of the sensor ICs, and a control device determines which detection signal is abnormal among the plurality of detection signals from the sensor ICs, on the basis of a comparison among the plurality of detection results, and
wherein when at least one detection signal has been determined to be abnormal among the plurality of detection signals respectively output from the plurality of detecting units of the sensor ICs, the control device further determines which detection signal is abnormal among the remaining plurality of detection signals other than the at least one detection signal determined to be abnormal, on the basis of a comparison among the plurality of detection results that are respectively obtained from the remaining plurality of detection signals.

2. The sensor device according to claim 1, wherein each of the sensor ICs outputs the plurality of detection signals to the control device via a plurality of signal lines as digital signals.

3. The sensor device according to claim 1, wherein each of the sensor ICs includes regulators provided for the plurality of detecting units, respectively, and each of the regulators regulates a power supply voltage of the corresponding sensor IC to a predetermined voltage corresponding to the corresponding detecting unit.

4. The sensor device according to claim 1, wherein
each of the sensor ICs includes an oscillator common to the plurality of detecting units, and the plurality of detecting units respectively include analog-to-digital conversion units that convert the detection signals from analog signals to digital signals using a clock signal that is generated in the common oscillator.

5. The sensor device according to claim 1, wherein each of the sensor ICs individually includes a feeder.

6. The sensor device according to claim 1, wherein each of the sensor ICs individually includes a ground line.

* * * * *